(12) United States Patent
Shi

(10) Patent No.: US 11,980,965 B2
(45) Date of Patent: May 14, 2024

(54) SYSTEMS AND METHODS FOR MULTI-LASER HEAD ALIGNMENT IN ADDITIVE MANUFACTURING SYSTEMS

(71) Applicant: General Electric Company, Schenectady, NY (US)

(72) Inventor: Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 16/392,188

(22) Filed: Apr. 23, 2019

(65) Prior Publication Data

US 2020/0338669 A1    Oct. 29, 2020

(51) Int. Cl.

| | | |
|---|---|---|
| *B23K 26/03* | (2006.01) | |
| *B22F 10/28* | (2021.01) | |
| *B22F 10/31* | (2021.01) | |
| *B22F 10/36* | (2021.01) | |
| *B22F 12/45* | (2021.01) | |
| *B22F 12/49* | (2021.01) | |
| *B22F 12/90* | (2021.01) | |
| *B23K 26/06* | (2014.01) | |
| *B23K 26/064* | (2014.01) | |
| *B23K 26/082* | (2014.01) | |
| *B23K 26/342* | (2014.01) | |

(Continued)

(52) U.S. Cl.
CPC ............ *B23K 26/032* (2013.01); *B22F 10/28* (2021.01); *B22F 10/31* (2021.01); *B22F 12/45* (2021.01); *B22F 12/49* (2021.01); *B22F 12/90* (2021.01); *B23K 26/0608* (2013.01); *B23K 26/064* (2015.10); *B23K 26/082* (2015.10); *B23K 26/342* (2015.10); *B33Y 30/00* (2014.12); *B33Y 50/00* (2014.12); *B22F 10/36* (2021.01)

(58) Field of Classification Search
CPC .............. B23K 26/032; B23K 26/0608; B23K 26/082; B23K 26/342; B33Y 30/00; B33Y 50/00
See application file for complete search history.

(56) References Cited

U.S. PATENT DOCUMENTS

| | | |
|---|---|---|
| 4,941,082 A | 7/1990 | Pailthorp et al. |
| 5,430,666 A | 7/1995 | DeAngelis et al. |

(Continued)

FOREIGN PATENT DOCUMENTS

WO    WO2018/122696 A1    7/2018

*Primary Examiner* — Nathaniel E Wiehe
*Assistant Examiner* — Dilnessa B Belay
(74) *Attorney, Agent, or Firm* — Dority & Manning, P.A.

(57) ABSTRACT

An additive manufacturing system includes a build platform and at least two laser heads. Each laser head includes at least one laser device, an optical sensor, and a computing device. The build platform includes a plurality of calibration marks. The laser device is configured to generate a laser beam. The laser beam is directed toward the plurality of calibration marks and the build platform. The optical sensor is configured to detect a scattering signal of the laser beam generated by reflecting off of the plurality of calibration marks and the build platform. The computing device is configured to receive the scattering signal from the optical sensor. The computing device is configured to align the laser heads such that the scattering signal aligns with the plurality of calibration marks and such that the laser heads align with each other.

16 Claims, 13 Drawing Sheets

(51) Int. Cl.
 *B33Y 30/00* (2015.01)
 *B33Y 50/00* (2015.01)

(56) References Cited

U.S. PATENT DOCUMENTS

| | | |
|---|---|---|
| 6,483,596 B1 | 11/2002 | Philippi et al. |
| 9,114,478 B2 | 8/2015 | Scott et al. |
| 10,112,260 B2 | 10/2018 | Crear et al. |
| 2005/0146721 A1* | 7/2005 | Consolini ............ G03F 9/7084 356/399 |
| 2009/0060386 A1* | 3/2009 | Cooper ................ G02B 26/105 382/294 |
| 2011/0037848 A1* | 2/2011 | Maguire ............. G03F 7/70416 348/86 |
| 2013/0178952 A1* | 7/2013 | Wersborg .......... G06F 18/21355 700/47 |
| 2016/0082668 A1 | 3/2016 | Perret et al. |
| 2016/0236279 A1 | 8/2016 | Ashton et al. |
| 2018/0093416 A1* | 4/2018 | Prexler .................. B33Y 10/00 |
| 2018/0290365 A1* | 10/2018 | Noorazar ................ B29C 48/92 |
| 2018/0370146 A1 | 12/2018 | Domröse et al. |
| 2019/0099809 A1* | 4/2019 | Hellestam ............... B22F 10/30 |
| 2019/0118481 A1* | 4/2019 | Brown ................. B29C 64/393 |
| 2019/0134747 A1 | 5/2019 | Herzog et al. |
| 2020/0023585 A1 | 1/2020 | Wiesner et al. |
| 2020/0057146 A1* | 2/2020 | Steinkogler ........... G01S 7/4816 |
| 2020/0156313 A1 | 5/2020 | Lehmann |
| 2020/0215762 A1* | 7/2020 | FrantzDale .......... B29C 64/393 |

* cited by examiner

SYSTEMS AND METHODS FOR MULTI-LASER HEAD ALIGNMENT IN ADDITIVE MANUFACTURING SYSTEMS

BACKGROUND

The field of the disclosure relates generally to additive manufacturing systems, and more particularly, to systems and methods for multi-laser head alignment in additive manufacturing systems.

At least some additive manufacturing systems involve the buildup of a powdered material to fabricate a component. These techniques can produce complex components from powdered materials at a reduced cost and with improved manufacturing efficiency. At least some known additive manufacturing systems, such as DMLM systems, fabricate components using multiple laser heads, a build platform, and a powdered material, such as, without limitation, a powdered metal. The laser heads each generate at least one laser beam that melt the powdered material on the build platform in and around the area where the laser beams are incident on the powdered material, resulting in a melt pool. The melt pool cools into a consolidated, solid top layer of the component. Multiple portions of the component may be manufactured simultaneously using multiple laser heads. As such, multiple laser heads reduce manufacturing time and reduce the cost to produce the component. The laser heads must be aligned before the start of the manufacturing process to ensure that the portions manufactured by each individual laser head are aligned throughout the manufacturing process. However, the laser heads may become misaligned during the manufacturing process due to thermal effects on optical components within the additive manufacturing system along the laser beam path.

BRIEF DESCRIPTION

In one aspect, an additive manufacturing system configured to manufacture a component is provided. The additive manufacturing system includes a build platform and at least two laser heads. Each laser head includes at least one laser device, an optical sensor, and a computing device. The build platform includes a plurality of calibration marks. The laser device is configured to generate a laser beam. The laser beam is directed toward the plurality of calibration marks and the build platform. The optical sensor is configured to detect a scattering signal of the laser beam generated by reflecting off of the plurality of calibration marks and the build platform. The computing device is configured to receive the scattering signal from the optical sensor. The computing device is configured to align the laser heads such that the scattering signal aligns with the plurality of calibration marks and such that the laser heads align with each other.

In another aspect, a method of aligning a first laser head and a second laser head of an additive manufacturing system is provided. The additive manufacturing system includes a build platform, the first laser head includes a first laser device, a first scanning device, a first optical sensor, and a first computing device. The second laser head including a second laser device, a second scanning device, a second optical sensor, and a second computing device. The build platform includes a plurality of calibration marks positioned on the build platform. The method includes directing a first laser beam from the first laser device to the build platform. The first laser beam is reflected by the build platform in a first scattering signal. The method also includes detecting the first scattering signal using the first optical sensor. The method further includes receiving a position of the first laser beam on the build platform from the first scanning device. The method also includes generating a first intensity map corresponding to the first scattering signal and the position of the first laser beam using the first computing device. The method further includes directing a second laser beam from the second laser device to the build platform. The second laser beam is reflected by the build platform in a second scattering signal. The method also includes detecting the second scattering signal using the second optical sensor. The method further includes receiving a position of the second laser beam on the build platform from the second scanning device. The method also includes generating a second intensity map corresponding to the second scattering signal and the position of the second laser beam using the second computing device. The method further includes comparing the first intensity map and the second intensity map to a standard map and aligning the first laser head and the second laser head based on the comparison of the first intensity map and the second intensity map to the standard map.

In yet another aspect, a method of aligning a first laser head and a second laser head of an additive manufacturing system is provided. The additive manufacturing system includes a build platform, the first laser head includes a first laser device, a first scanning device, a first optical sensor, and a first computing device. The second laser head including a second laser device, a second scanning device, a second optical sensor, and a second computing device. The method includes generating a plurality of calibration marks on a top side of the build platform using a first laser beam generated by the first laser device and a build file. The method also includes directing the second laser beam from the second laser device to the build platform. The second laser beam is reflected by the build platform in a second scattering signal. The method further includes detecting the second scattering signal using the second optical sensor, receiving the second position signal from the second scanning device, and generating a second intensity map corresponding to the second scattering signal and position signal using the second computing device. The method also includes comparing the second intensity map to the build file and aligning the first laser head and the second laser head based on the comparison of the second intensity map to the build file.

DRAWINGS

These and other features, aspects, and advantages of the present disclosure will become better understood when the following detailed description is read with reference to the accompanying drawings in which like characters represent like parts throughout the drawings, wherein:

FIG. 1 is a schematic view of an exemplary additive manufacturing system shown in the form of a direct metal laser melting (DMLM) system;

FIGS. 2A-C are a flow diagram of a read-read alignment method of aligning at least two laser beams within the additive manufacturing system shown in FIG. 1;

Figure 1:
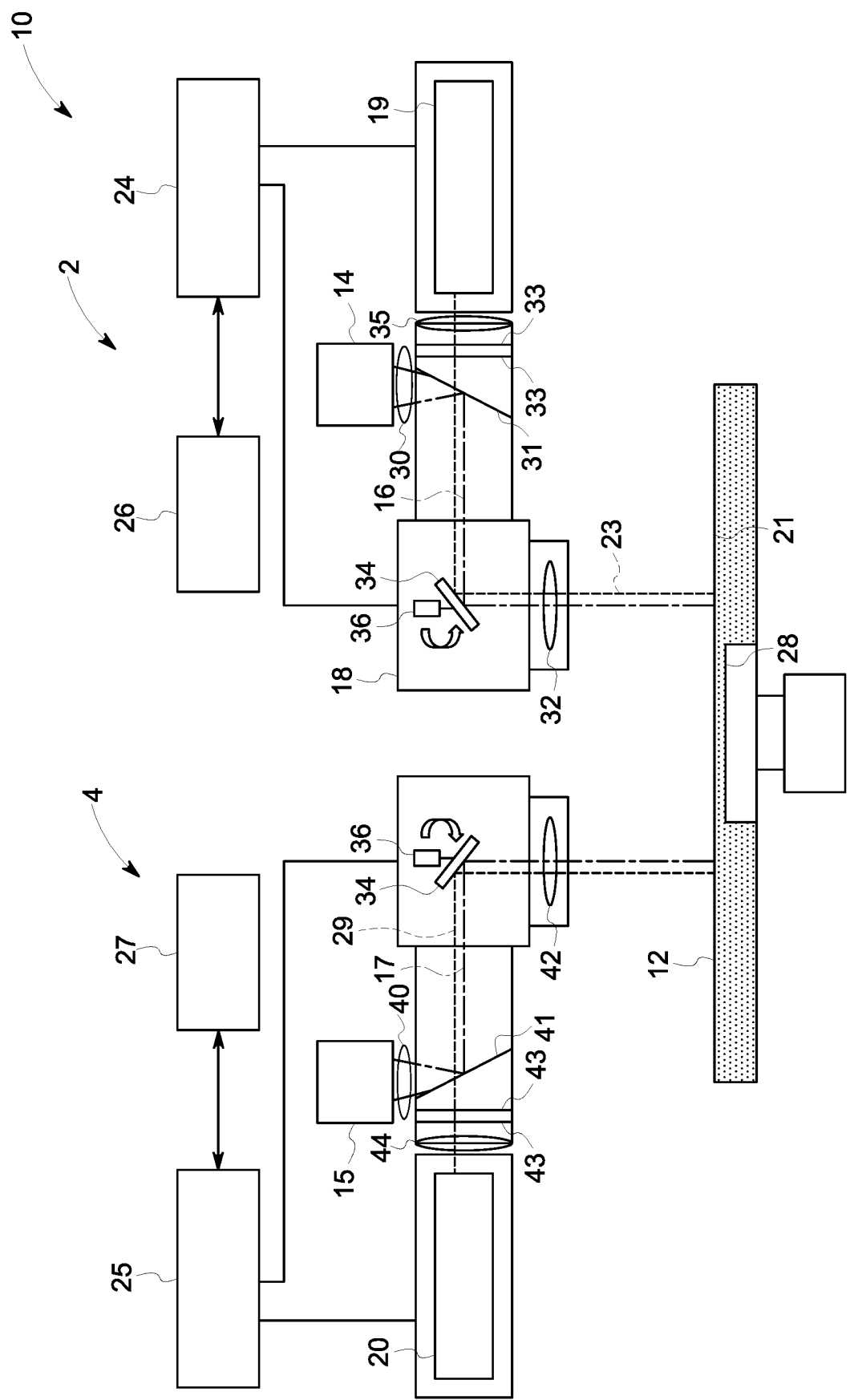
Figure 6A:
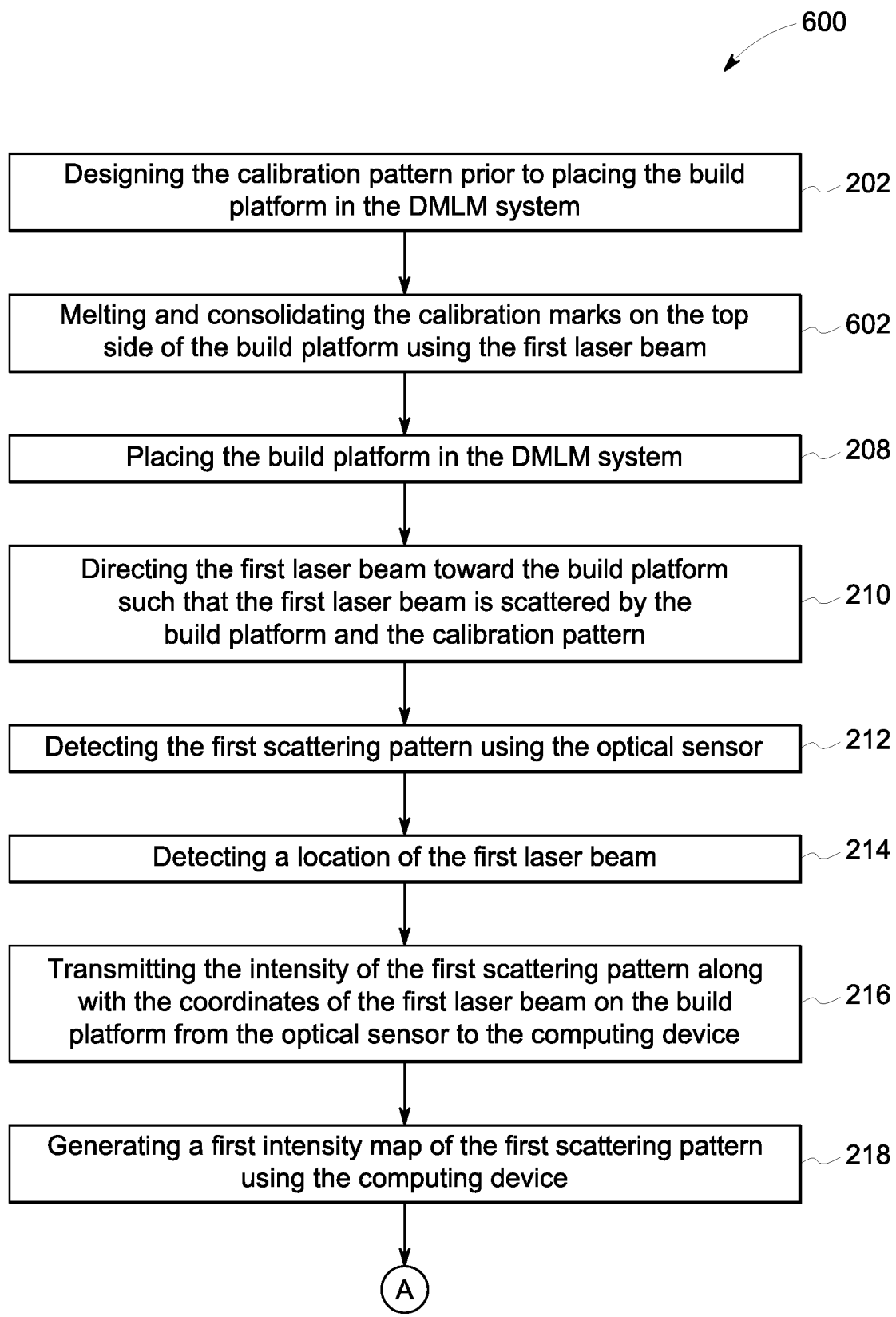
Figure 6B:
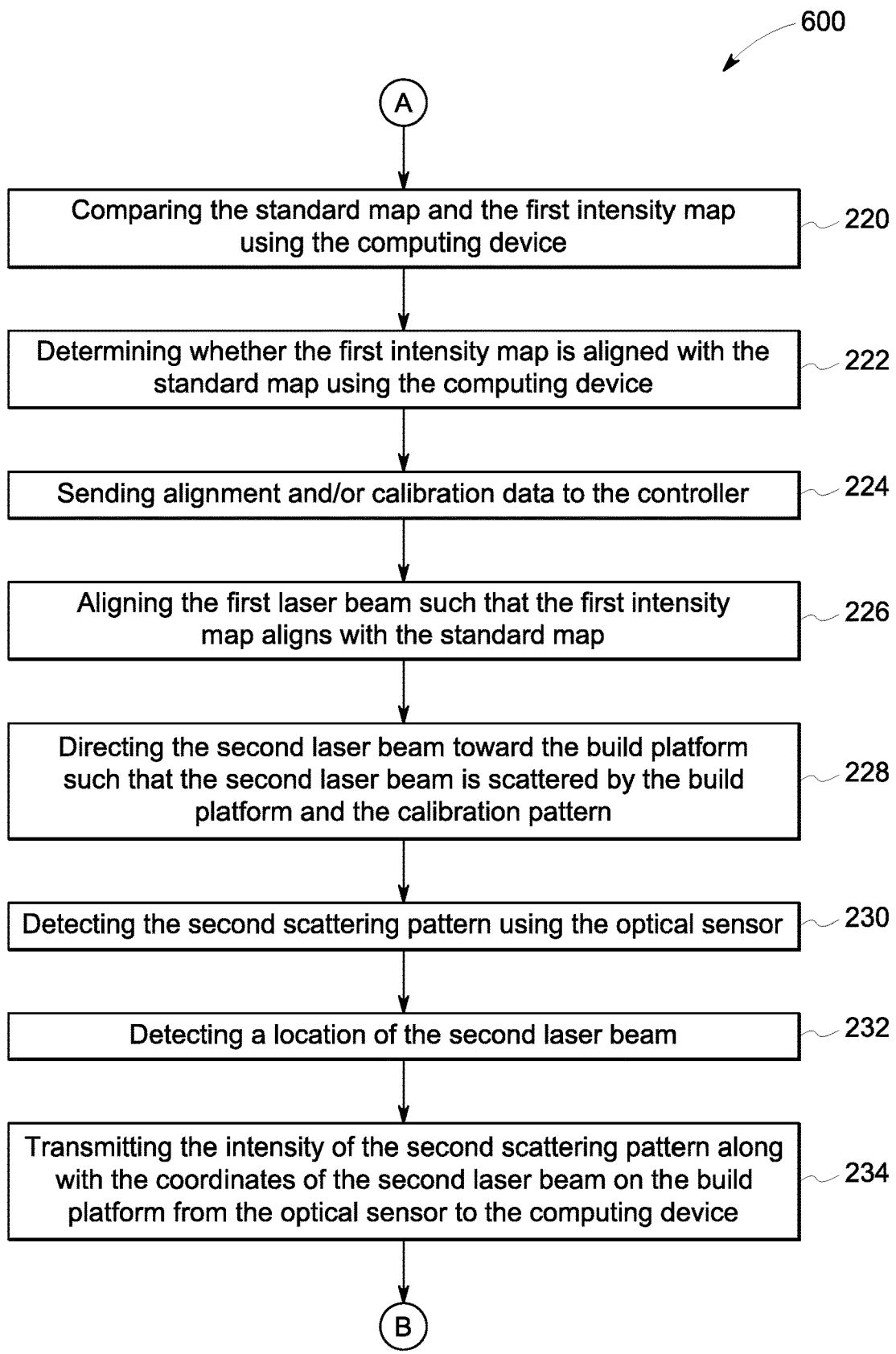
Figure 6C:
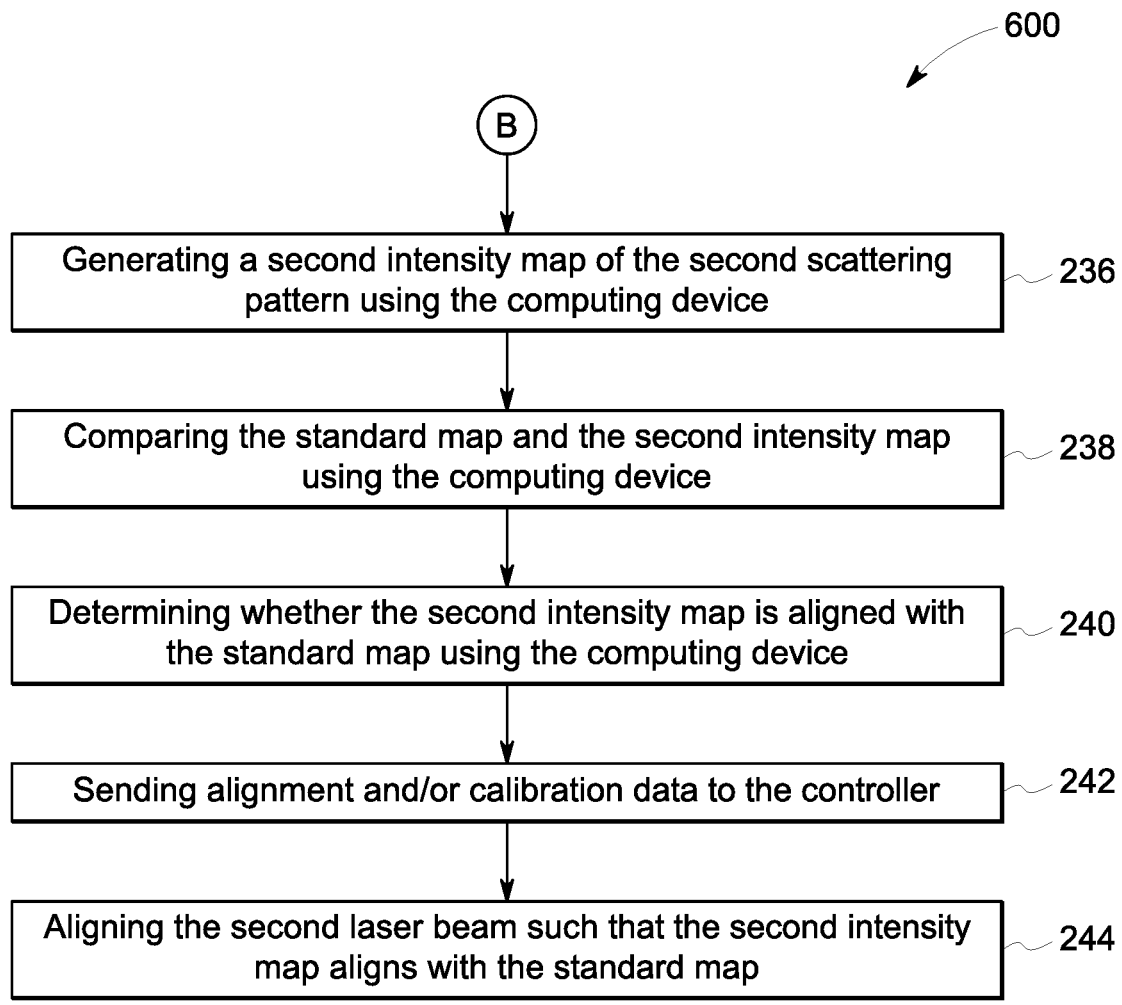
Figure 7A:
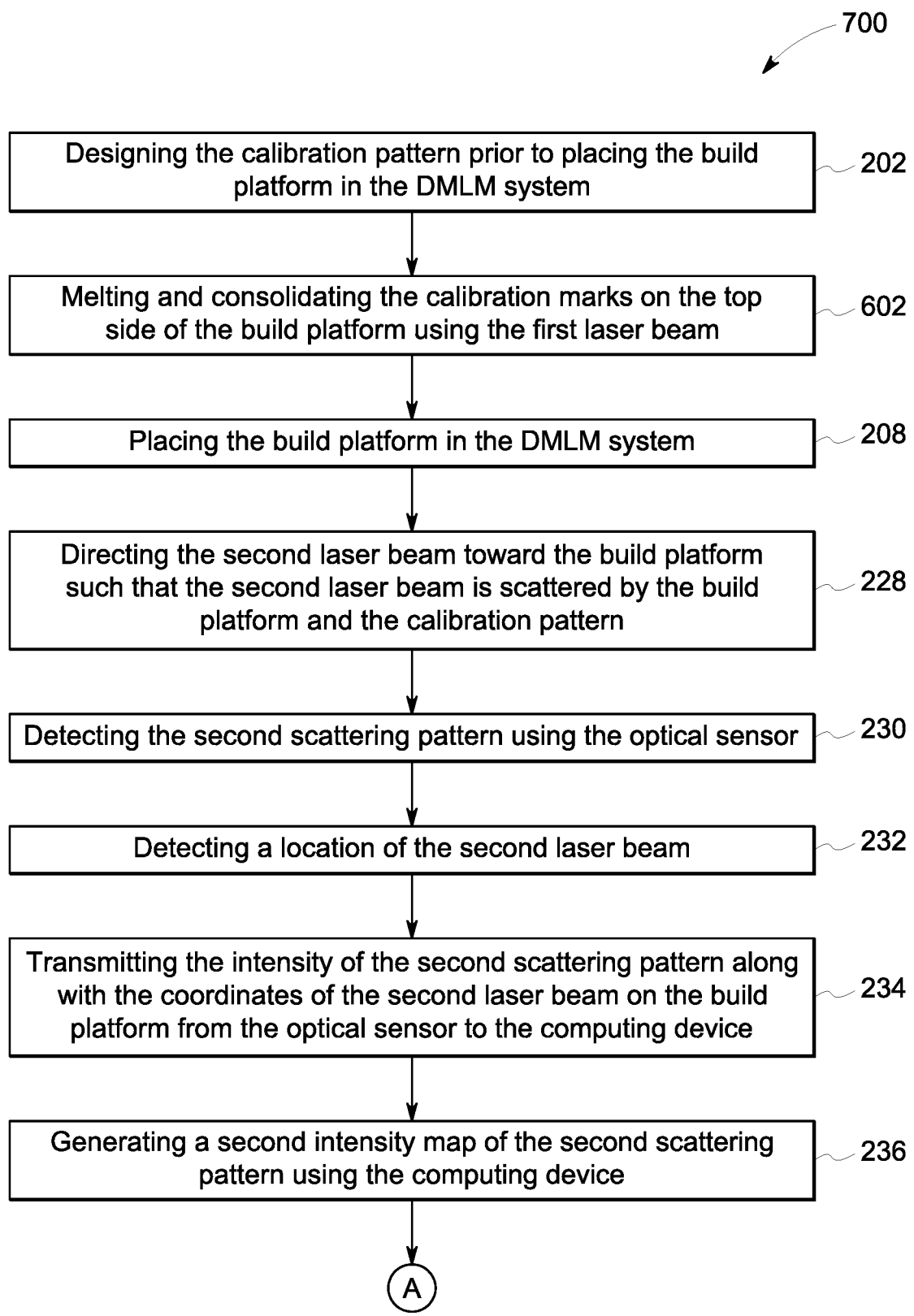
Figure 7B:
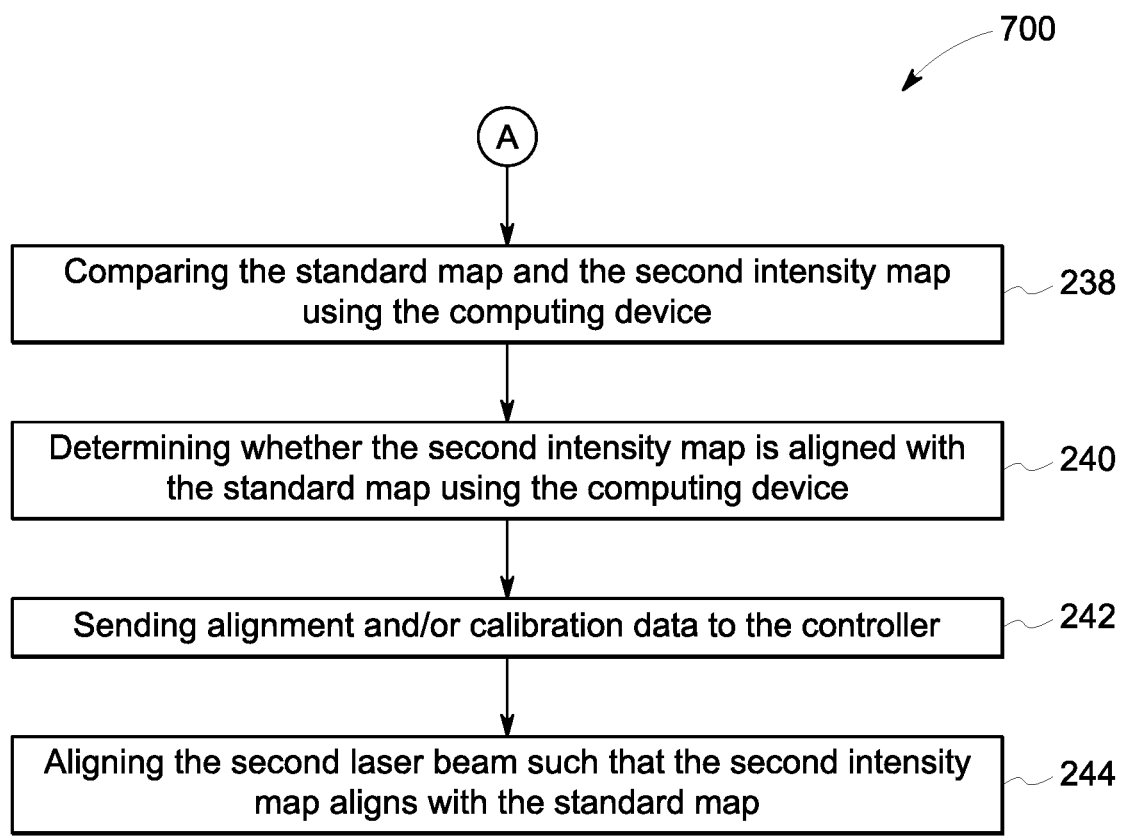
Figure 8A:
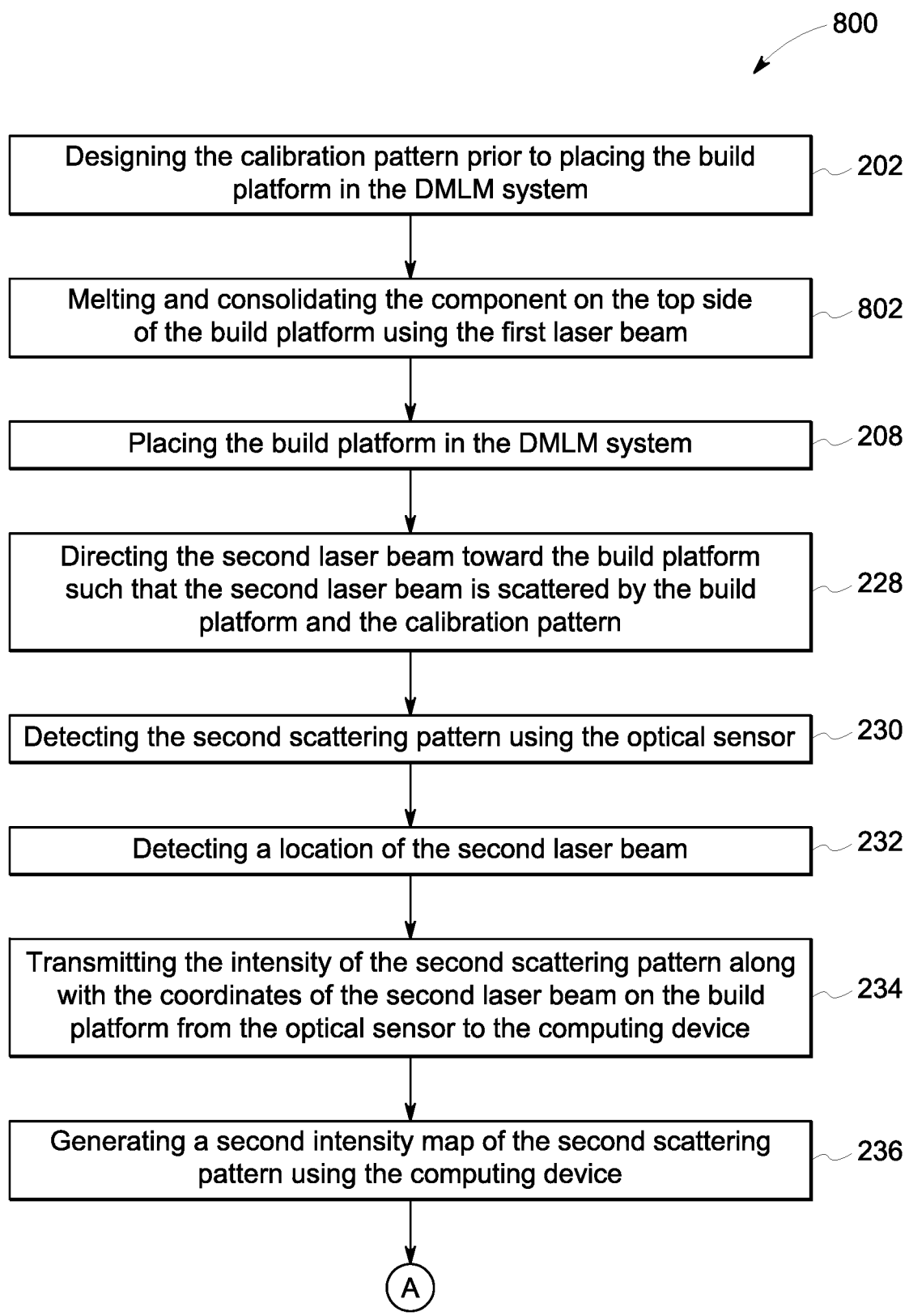
Figure 8B:
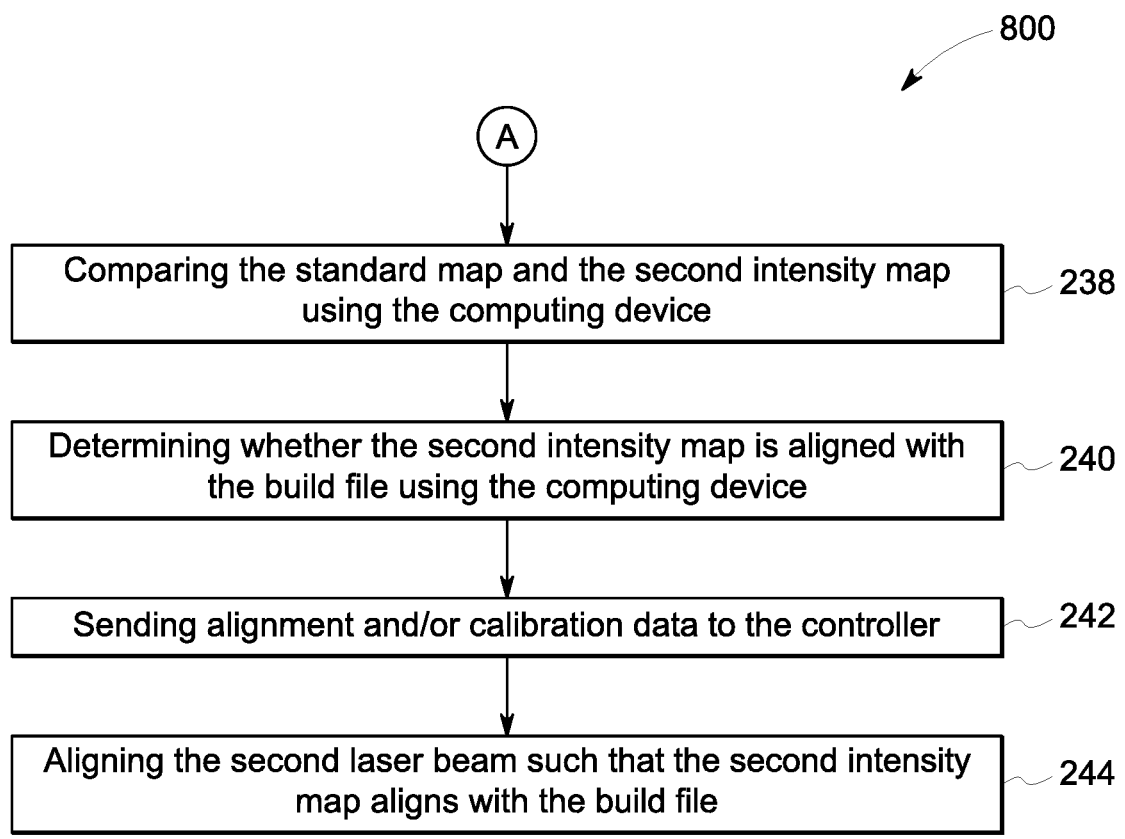

FIGS. 6A-C are a flow diagram of a write-read-read alignment method of aligning at least two laser beams within the additive manufacturing system shown in FIG. 1;

FIGS. 7A-B are a flow diagram of a write-read alignment method of aligning at least two laser beams within the additive manufacturing system shown in FIG. 1; and FIGS. 8A-B are a flow diagram of a build-read alignment method of aligning at least two laser beams within the additive manufacturing system shown in FIG. 1.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of additive manufacturing systems described herein align at least two laser heads in the additive manufacturing system. The additive manufacturing system includes at least two laser beams generated by at least two laser heads, a build platform, and at least two optical sensors. Having more than one laser beam allows the additive manufacturing system to manufacture a component faster than if the additive manufacturing system has only one laser beam. However, the component may not be properly manufactured according to a build file if the laser beams and/or the laser heads are not aligned. The additive manufacturing system described herein is capable of aligning the laser beams and/or the laser heads using four alignment methods: (1) a read-read alignment method; (2) a write-read-read alignment method; (3) a write-read alignment method; and (4) a build-read alignment method. In the read-read alignment method, a build platform with a plurality of pre-existing calibration marks arranged in a calibration pattern is placed in the DMLM system. The laser beams are directed to the build platform by the laser heads, and the optical sensors detect a scattering signal reflected off of the build platform and the calibration pattern. An intensity map is generated based on the detected scattering signal and positional data of the laser beams on the build platform, and compared to a standard map of the calibration pattern. An alignment of each laser beam and/or laser head is determined based on the comparison of the intensity map to the standard map. The laser heads are then aligned such that the intensity map aligns with the standard map, and, as such, the laser beams are aligned with each other.

The write-read-read alignment method is similar to the read-read alignment method, except the calibration marks are not pre-existing on the build platform. Rather, a first laser beam writes the calibration pattern on the build platform, and the laser beams each scan the calibration pattern. The write-read alignment method is similar to the write-read-read alignment method except the first laser beam does not scan the calibration pattern. The build-read alignment method is similar to the write-read alignment method except the first laser beam does not write the calibration pattern on the build platform. Rather, the first laser beam builds a portion of the component on the build platform, and the second laser beam then scans the recently built portion of the component.

The methods described herein align at least two laser heads and at least two laser beams using existing additive manufacturing hardware. Additionally, the laser beams can simultaneously scan the build platform for quick alignment. Furthermore, the build platform may be reused for the manufacture of multiple components. Accordingly, the methods described herein provide a fast, cost effective method of aligning at least two laser heads and at least two laser beams.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems, such as selective laser sintering systems, or systems using electron beam as the consolidation energy source.

In the exemplary embodiment, as shown in FIG. 1, DMLM system 10 includes a first laser head 2, a second laser head 4, and a build platform 12. First laser head 2 includes at least one laser device 14 configured to generate at least one laser beam 16 and a first scanning device 18 configured to selectively direct laser beam 16 across build platform 12 to melt a powdered build material 21 on build platform 12. In the exemplary embodiment, first laser head 2 includes a first laser device 14 configured to generate a first laser beam 16. In the exemplary embodiment, first laser beam 16 is a focused laser beam. In an alternative embodiment, first laser head 2 includes multiple laser devices configured to generate plurality of laser beams. Additionally, in the illustrated embodiment, first laser head 2 generates a single laser beam 16. However, first laser head 2 may generate any number of laser beams that enable DMLM system 10 to operate as described herein. First laser head 2 also includes a first optical sensor 19 configured to detect first laser beam 16 on build platform 12. First laser head 2 further includes a first computing device 24, which includes a first data acquisition system 24, and a first controller 26 configured to control one or more components of first laser head 2 and/or DMLM system 10, as described in more detail herein.

Similarly, second laser head 4 includes at least one laser device 15 configured to generate at least one laser beam 17 and a second scanning device 13 configured to selectively direct laser beam 17 across build platform 12 to melt powdered build material 21 on build platform 12. In the exemplary embodiment, second laser head 4 includes a second laser device 15 configured to generate a second laser beam 17. In the exemplary embodiment, second laser beam 17 is a focused laser beam. In an alternative embodiment, second laser head 4 includes multiple laser devices configured to generate plurality of laser beams. Additionally, in the illustrated embodiment, second laser head 4 generates a single laser beam 17. However, second laser head 4 may generate any number of laser beams that enable DMLM system 10 to operate as described herein. Second laser head 4 also includes a second optical sensor 20 configured to detect second laser beam 17 on build platform 12. Second laser head 4 further includes a second computing device 25 (or second data acquisition system 25) and a second controller 27 configured to control one or more components of second laser head 4 and/or DMLM system 10, as described in more detail herein.

Powdered build material 21 on build platform 12 is melted and re-solidified during the additive manufacturing process to build a solid, consolidated component 28. Powdered build material 21 includes materials suitable for forming such components, including, without limitation, gas atomized alloys of cobalt, iron, aluminum, titanium, nickel, and combinations thereof. In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins.

As shown in FIG. 1, laser devices 14 and 15 are configured to generate laser beams 16 and 17 of sufficient energy to at least partially melt powdered build material 21. In the exemplary embodiment, laser devices 14 and 15 are a yttrium-based solid state laser configured to emit laser beams 16 and 17 having a wavelength of about 1070 nanometers (nm), a laser spot size of about 50 μm to about 200 μm, and a scan speed of about 200 mm/s to about 20 m/s. In other embodiments, laser devices 14 and 15 generate any suitable type of laser beam that enables DMLM system 10 to function as described herein, such as a carbon dioxide laser.

First laser head 2 includes a plurality of first optical elements 30, 31, 32, and 35, and first laser device 14 is optically coupled to first optical elements 30, 31, and 32 to facilitate focusing first laser beam 16 on build platform 12. In the exemplary embodiment, first optical elements 30, 31, and 32 include a first beam collimator 30 disposed between first laser device 14 and first two-way mirror 31, a first two-way mirror 31 configured to deflect first laser beam 16 toward first scanning device 18, and a first F-theta lens 32 disposed between first scanning device 18 and build platform 12. In the exemplary embodiment, first two-way mirror 31 is a dichroic mirror with significantly different reflection or transmission properties at two different wavelengths. In other embodiments, first laser head 2 includes any suitable type and arrangement of optical elements that provide a collimated and/or focused laser beam on build platform 12. Additionally, first optical channel includes a lens 35 configured to focus a first scattering signal 23 on first optical sensor 19.

Similarly, second laser head 4 includes a plurality of second optical elements 40, 41, 42, and 44, and second laser device 15 is optically coupled to second optical elements 40, 41, and 42 to facilitate focusing second laser beam 17 on build platform 12. In the exemplary embodiment, second optical elements 40, 41, and 42 include a second beam collimator 40 disposed between second laser device 15 and second two-way mirror 41, a second two-way mirror 41 configured to deflect second laser beam 17 toward second scanning device 13, and a second F-theta lens 42 disposed between second scanning device 13 and build platform 12. In the exemplary embodiment, second two-way mirror 41 is a dichroic mirror with significantly different reflection or transmission properties at two different wavelengths. In other embodiments, second laser head 4 includes any suitable type and arrangement of optical elements that provide a collimated and/or focused laser beam on build platform 12. Additionally, second optical channel includes a lens 44 configured to focus a second scattering signal 29 on second optical sensor 20.

As shown in FIG. 1, first and second scanning devices 18 and 13 are configured to direct laser beams 16 and 17 across selective portions of build platform 12 to create solid component 28. In the exemplary embodiment, first and second scanning devices 18 and 13 are a galvanometer scanning device each including a mirror 34 operatively coupled to a galvanometer-controlled motor 36 (broadly, an actuator). Motor 36 is configured to move, e.g., rotate, mirror 34 in response to signals received from controllers 26 and 27, and thereby deflect laser beams 16 and 17 across selective portions of build platform 12. Mirror 34 has any suitable configuration that enables mirror 34 to deflect laser beams 16 and 17 towards build platform 12. In some embodiments, mirror 34 includes a reflective coating having a reflectance spectrum that corresponds to the wavelength of laser beams 16 and 17.

Optical sensors 19 and 20 are configured to detect the scattering of laser beams 16 and 17 by build platform 12. In the exemplary embodiment, optical sensors 19 and 20 are positioned in an on-axis configuration in which optical sensors 19 and 20 are conjugate with the focus of laser beams 16 and 17. As such, when laser beams 16 and 17 move, optical sensors 19 and 20 follow laser beams 16 and 17. As discussed further below, laser beams 16 and 17 are focused on a location of build platform 12. The scattering of laser beams 16 and 17 produces scattering signals 23 and 29 that are reflected to mirrors 34 and optical sensors 19 and 20. Optical sensors 19 and 20 are configured to detect scattering signals 23 and 29. Specifically, optical sensors 19 and 20 are configured to detect the intensity of scattering signals 23 and 29. Scanning devices 18 and 13 are configured to output positional data, such as x-y coordinates, of laser beams 16 and 17 on build platform 12. Computing devices 24 and 25 receive in synchronized way the scattering signals 23 and 29 from optical sensors 19 and 20, and the coordinates of laser beams 16 and 17 on build platform 12 by receiving positional data from scanning devices 18 and 13. Accordingly, the intensity data recorded by optical sensors 19 and 20 corresponds to the positional data recorded by scanning devices 18 and 13 because the acquisition of the intensity value of scattering signals 23 and 29 by optical sensors 19 and 20 is synchronized with the acquisition of positional data by scanning devices 18 and 13. Computing devices 24 and 25 are then configured to receive the intensity data of scattering signals 23 and 29 from optical sensors 19 and 20 and the positional data recorded by scanning devices 18 and 13. Computing devices 24 and 25 are then configured to generate an intensity map based on the intensity data received from optical sensors 19 and 20 for each laser beam 16 and 17 and the positional data from scanning devices 18 and 13 for each laser beam 16 and 17. Accordingly, computing devices 24 and 25 are configured to correlate the intensity data and the positional data into an intensity map for each laser beam 16 and 17. Computing devices 24 and 25 are then configured to compare the generated intensity maps to a standard map or to each other to determine if laser heads 2 and 4 and/or laser beams 16 and 17 are aligned. Controllers 26 and 27 are then configured to correct the scanner calibration parameters of scanning devices 18 and 13 to align laser heads 2 and 4 and/or laser beams 16 and 17. In the exemplary embodiment, optical sensors 19 and 20 are a photo-diode sensors or Avalanche photo-diodes and have a sampling rate of about 10 kHz to about 1 MHz. However, optical sensors 19 and 20 may be any type of optical sensor that enables DMLM system 10 to operate as described herein. First laser head 2 also includes at least one first filter 33 configured to remove stray optical signals, or leakage from other sources of optical signals, from first scattering signal 23. Second laser head 4 also includes at least one second filter 43 configured to remove stray optical signals, or leakage from other sources of optical signals, from second scattering signal 29.

Although scanning devices 18 and 13 are illustrated with a single mirror 34 and a single motor 36, scanning devices 18 and 13 may include any suitable number of mirrors and motors that enable scanning devices 18 and 13 to function as described herein. In one embodiment, scanning devices 18 and 13 each include two mirrors 34 and two galvanometer-controlled motors 36, each operatively coupled to one of the mirrors 34. In other embodiments, scanning devices 18 and 13 include any suitable scanning device that enables DMLM system 10 to function as described herein, such as, for example, two-dimensional (2D) scan galvanometers, three-dimensional (3D) scan galvanometers, and dynamic focusing galvanometers.

During operations, scanning devices 18 and 13 each direct laser beams 16 and 17 across selective portions of build platform 12 to create solid component 28. Specifically, laser beams 16 and 17 melt powdered build material 21, and powdered build material 21 cools into a layer of solid component 28. Once a layer has cooled into a portion of component 28, additional powdered build material 21 is spread over the layer to form a new layer. Accordingly, component 28 is consolidated layer by layer. In the exemplary embodiment, laser beams 16 and 17 simultaneously melt powdered build material 21 to consolidate solid component 28 faster than if a single laser was consolidating solid component 28, reducing manufacturing time to produce solid component 28 and reducing the cost to produce solid component 28. Laser beams 16 and 17 and/or laser heads 2 and 4 must be aligned before the start of the manufacturing process to ensure that the portions manufactured by each individual laser beam 16 and 17 are aligned throughout the manufacturing process. However, laser beams 16 and 17 and/or laser heads 2 and 4 may become misaligned during the manufacturing process due to thermal effects on optical elements 30, 31, 32, 40, 41, and 42 and mirrors 34. DMLM system 10 aligns laser beams 16 and 17 and/or laser heads 2 and 4 before the manufacturing process and may realign laser beams 16 and 17 and/or laser heads 2 and 4 during the manufacturing process as described below.

As shown in FIG. 1, computing devices 24 and 25 each include a computer system that includes at least one processing device and at least one memory device that executes executable instructions to operate DMLM system 10. Computing devices 24 and 25 include, for example, an electronic computer build file associated with a component, such as component 28. The build file includes build parameters that are used to control one or more components of DMLM system 10. Build parameters include, without limitation, a power of laser devices 14 and 15, a scan speed of scanning devices 18 and 13, and a position and scan orientation of scanning devices 18 and 13 (specifically, mirror 34). In the exemplary embodiment, computing devices 24 and 25 and controllers 26 and 27 are shown as separate devices. In other embodiments, computing devices 24 and 25 and controllers 26 and 27 are combined as a single device that operates as computing devices 24 and 25 and controllers 26 and 27 as each are described herein.

Controllers 26 and 27 each include any suitable type of controller that enables DMLM system 10 to function as described herein. In one embodiment, for example, controllers 26 and 27 are a computer system that includes at least one processor and at least one memory device that executes executable instructions to control the operation of DMLM system 10 based at least partially on instructions from human operators. Controllers 26 and 27 each include, for example, a 3D model of component 28 to be fabricated by DMLM system 10. Executable instructions executed by controller s 26 and 27 include, for example, controlling the power output of laser devices 14 and 15, controlling a position and scan speed of scanning devices 18 and 13, and controlling a position and rotation rate of build platform 12.

Controllers 26 and 27 are configured to control one or more components of DMLM system 10 based on build parameters associated with a build file stored, for example, within computing devices 24 and 25. In the exemplary embodiment, controllers 26 and 27 are configured to control scanning devices 18 and 13 based on a build file associated with a component to be fabricated with DMLM system 10. More specifically, controllers 26 and 27 are configured to control the position, movement, and scan speed of mirrors 34 using motors 36 based upon a predetermined path defined by a build file associated with component 28.

In the exemplary embodiment, computing devices 24 and 25 and/or controllers 26 and 27 are also configured to operate at least partially as a data acquisition device and to monitor the operation of DMLM system 10 during fabrication of component 28. In one embodiment, for example, computing devices 24 and 25 and/or controllers 26 and 27 receive and process laser beam positional data from the scanning devices optical sensors 19 and 20. Computing devices 24 and 25 and/or controllers 26 and 27 store and analyze the positional data, which is used to align laser beams 16 and 17 and/or laser heads 2 and 4 and to facilitate controlling and refining a build process for DMLM system 10 or for a specific component built by DMLM system 10.

In the embodiments described herein, laser beams 16 and 17 and/or laser heads 2 and 4 may be aligned with each other using four different alignment methods: (1) a read-read alignment method; (2) a write-read-read alignment method; (3) a write-read alignment method; and (4) a build-read alignment method.

Figure 2A:
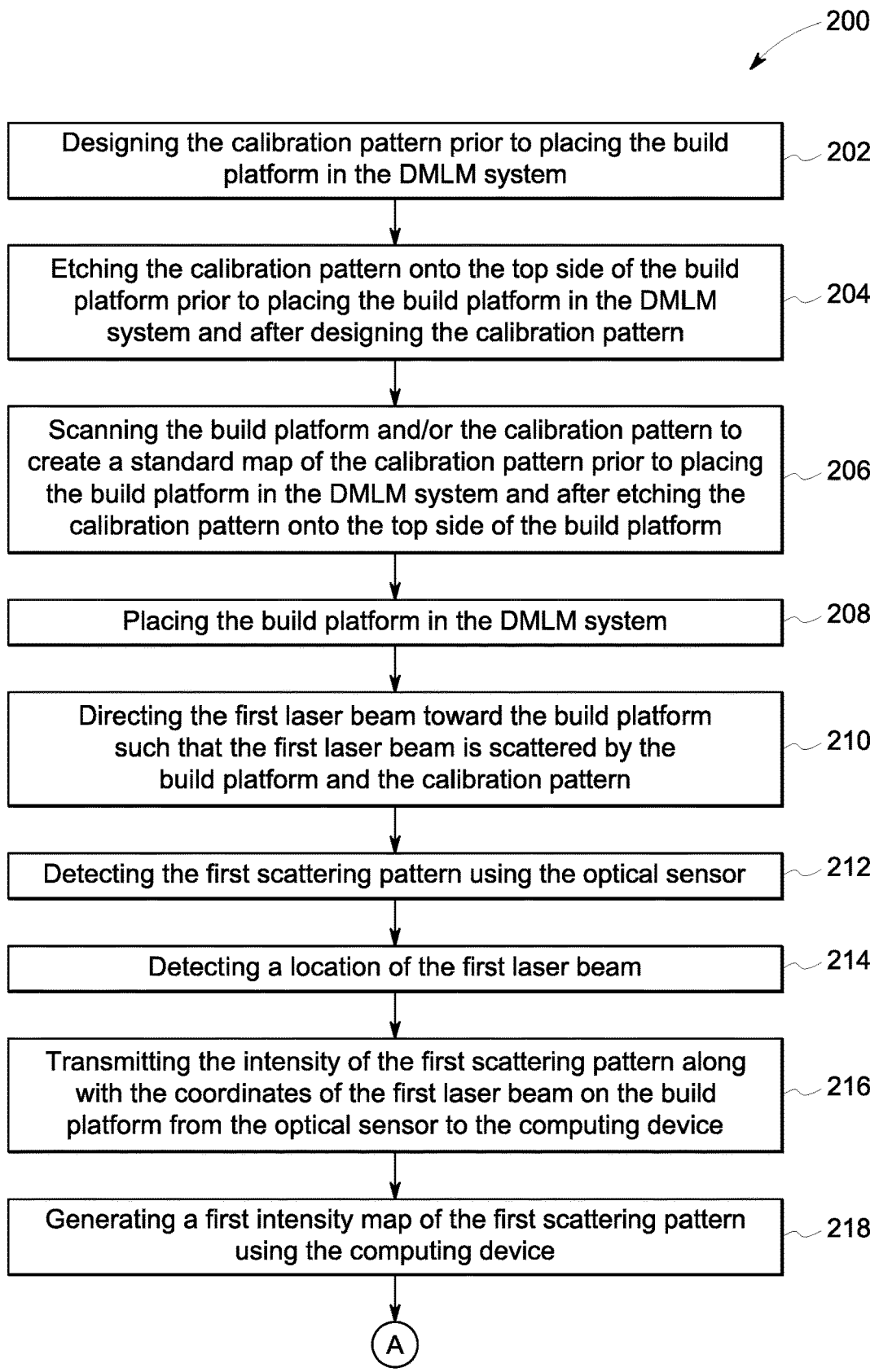
Figure 2B:
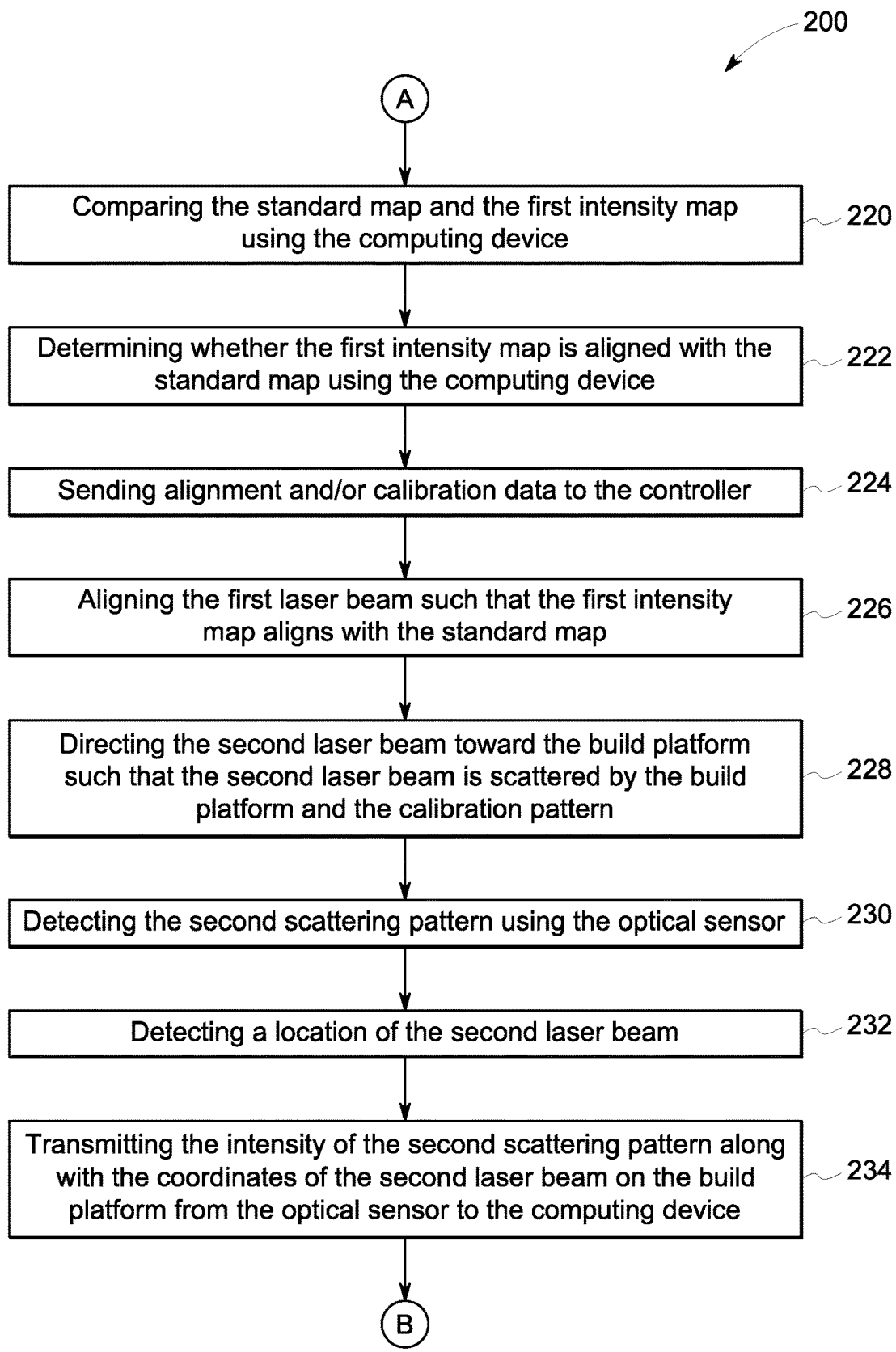
Figure 2C:
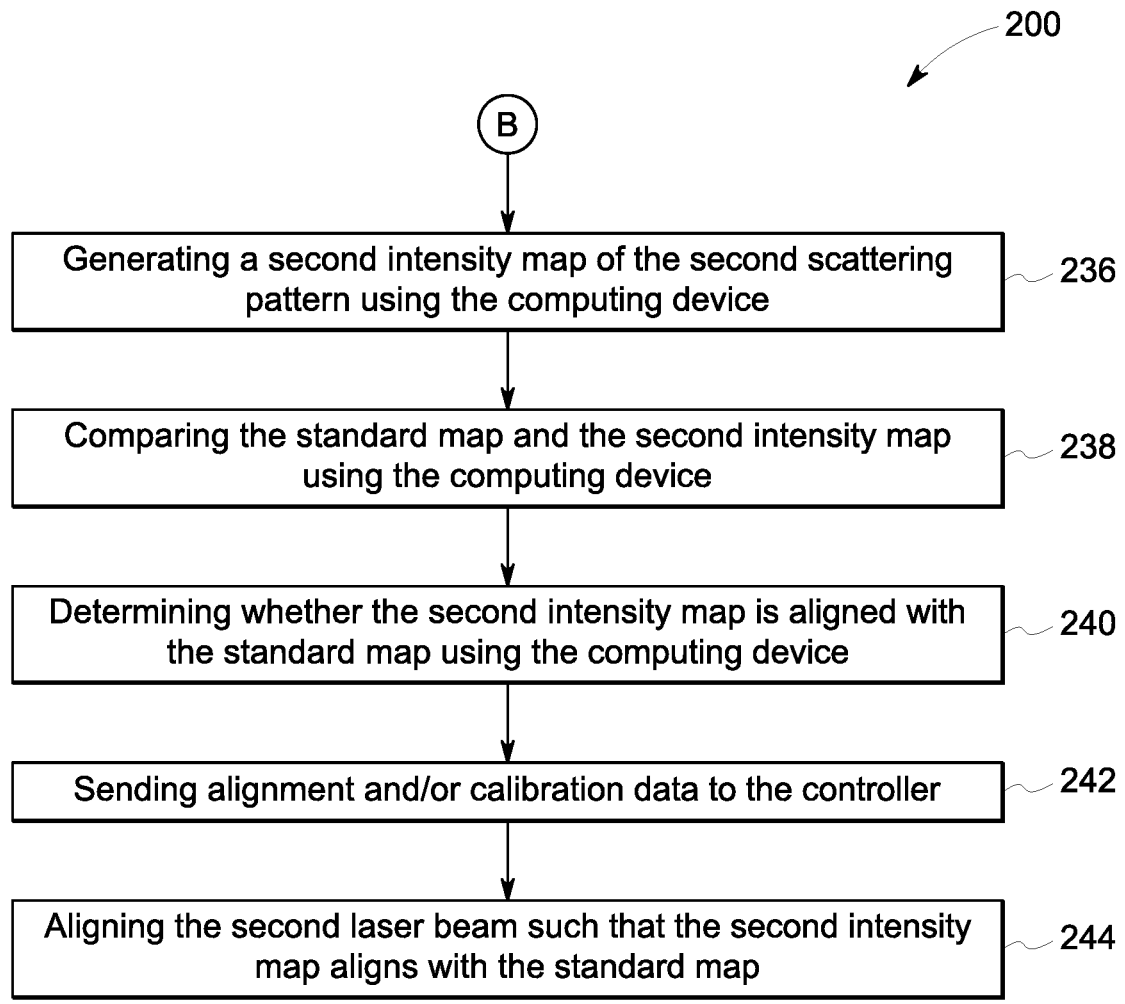
Figure 3:
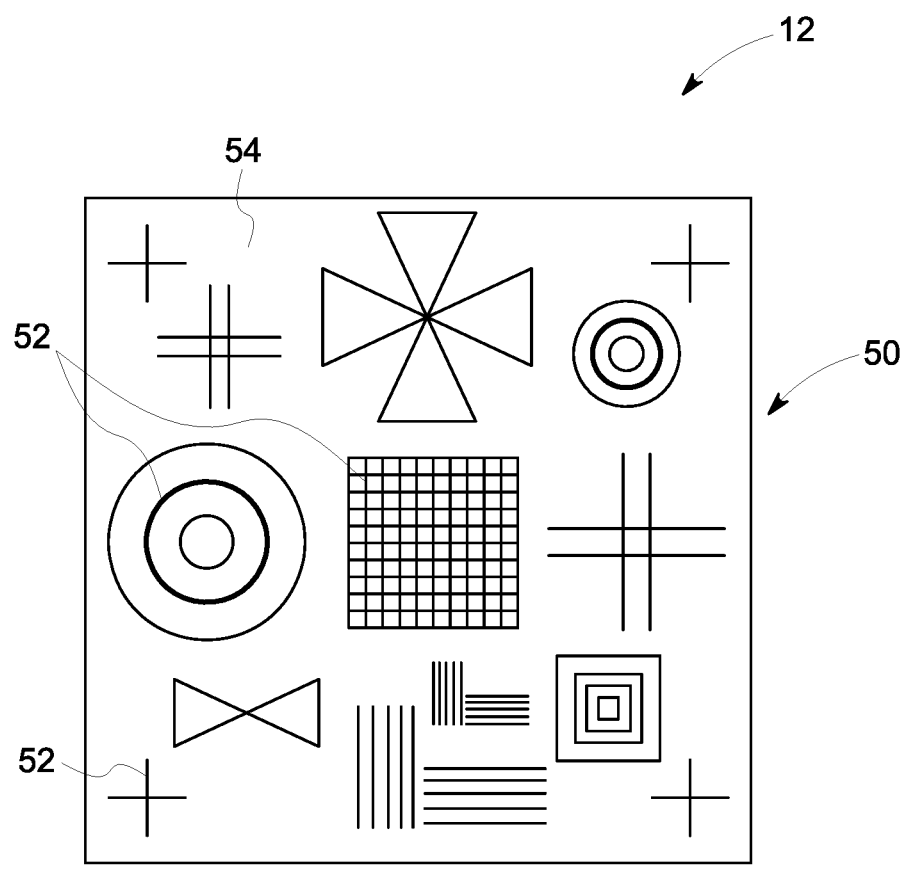
FIG. 3 is a schematic top view of an exemplary build platform of the additive manufacturing system shown in FIG. 1.

FIG. 2 is a flow diagram of a read-read alignment method 200. Read-read alignment method 200 includes placing 208 build platform 12 in DMLM system 10 at a normal height. FIG. 3 is a schematic top view of build platform 12. In the exemplary embodiment, build platform 12 has a rectangular shape. In other embodiments, build platform 12 may have any suitable size and shape that enables DMLM system 10 to function as described herein. In the exemplary embodiment, build platform 12 includes a calibration pattern 50 including at least one calibration mark 52 on a top side 54 of build platform 12. In the exemplary embodiment, calibration pattern 50 includes a plurality of calibration marks 52. In other embodiments, calibration pattern 50 may have any number of calibration marks 52 that enable DMLM system 10 to operate as described herein.

In the exemplary embodiment, the portions of top side 54 of build platform 12 that do not include calibration marks 52 have a first reflectance for laser beams 16 and 17, and calibration marks 52 have a second reflectance, different than the first reflectance, for laser beams 16 and 17. The difference in reflectance allows optical sensors 19 and 20 to detect when laser beams 16 and 17 are directed toward calibration marks 52 or portions of top side 54 of build platform 12 without calibration marks 52. In the exemplary embodiment, calibration marks 52 have any shape that enables DMLM system 10 to operate as described herein. For example, the calibration mark shape may include, without limitation, a cross shape, a circle shape, a triangle shape, and/or any shape which enables DMLM system 10 to operate as described herein. Additionally, calibration marks 52 may include patterns such as a grid pattern, a pattern of dots, a checkerboard pattern, and/or any other pattern which enables DMLM system 10 to operate as described herein.

As shown in FIG. 3, build platform 12 includes a plurality of calibration marks 52 arranged in calibration pattern 50. Build platform 12 used in read-read alignment method 200 has calibration pattern 50 formed onto top side 54 of build platform 12 prior to placing 208 build platform 12 in DMLM system 10. As such, calibration pattern 50 has been designed and formed onto build platform 12. Additionally, a standard map 402 of calibration pattern 50 has already been created. Standard map 402 is a pre-scanned standard intensity pattern of calibration pattern 50. In some embodiments, standard map 402 is created by computing devices 24 and 25. In alternative embodiments, standard map 402 is created by a scanning and computing device that is not associated with DMLM system 10. Accordingly, read-read alignment method 200 may optionally include designing 202 calibration pattern 50 prior to placing 208 build platform 12 in DMLM system 10. Calibration pattern 50 is designed 202 such that calibration marks 52 have a different reflectance than the portions of top side 54 of build platform 12 without calibration marks 52. In one embodiment, read-read alignment method 200 also includes forming 204 calibration pattern 50 onto top side 54 of build platform 12 prior to placing 208 build platform 12 in DMLM system 10 and after designing 202 calibration pattern 50. Calibration pattern 50 is formed 204 onto top side 54 of build platform 12 using any method that enables DMLM system 10 to operate as described herein. Read-read alignment method 200 may also optionally include scanning 206 build platform 12 and/or calibration pattern 50 to create a standard map of calibration pattern 50 prior to placing 208 build platform 12 in DMLM system 10 and after formed 204 calibration pattern 50 onto top side 54 of build platform 12. Calibration pattern 50 is scanned 206 using any method that enables DMLM system 10 to operate as described herein.

Read-read alignment method 200 further includes directing 210 first laser beam 16 toward build platform 12 such that first laser beam 16 is scattered by build platform 12 and calibration pattern 50. In the exemplary embodiment, first laser beam 16 has a relatively low laser power, for example about 50 Watts, to avoid damaging build platform 12 and calibration pattern 50. First laser beam 16 is scattered by build platform 12 and calibration pattern 50 to produce a first scattering signal 23 which is reflected back to mirror 34 and first optical sensor 19.

Read-read alignment method 200 also includes receiving 212 first scattering signal 23 using first optical sensor 19, and simultaneously receiving 214 a location of first laser beam 16. If first laser beam 16 is not incident on calibration marks 52, first scattering signal 23 will have a first reflectance, and if first laser beam 16 is incident on calibration marks 52, first scattering signal 23 will have a second reflectance different than the first reflectance. Specifically, first optical sensor 19 detects the intensity of first scattering signal 23, and first computing device 24 receives the coordinates of first laser beam 16 on build platform 12 by receiving positional data from first scanning device 18.

Read-read alignment method 200 also includes transmitting 216 the intensity of first scattering signal 23 along with the coordinates of first laser beam 16 on build platform 12 from first optical sensor 19 to first computing device 24. Specifically, first optical sensor 19 generates an electrical signal that is electronically transmitted to first computing device 24. The electrical signal includes the intensity of first scattering signal 23 along with the coordinates of first laser beam 16 on build platform 12.

Figure 4:
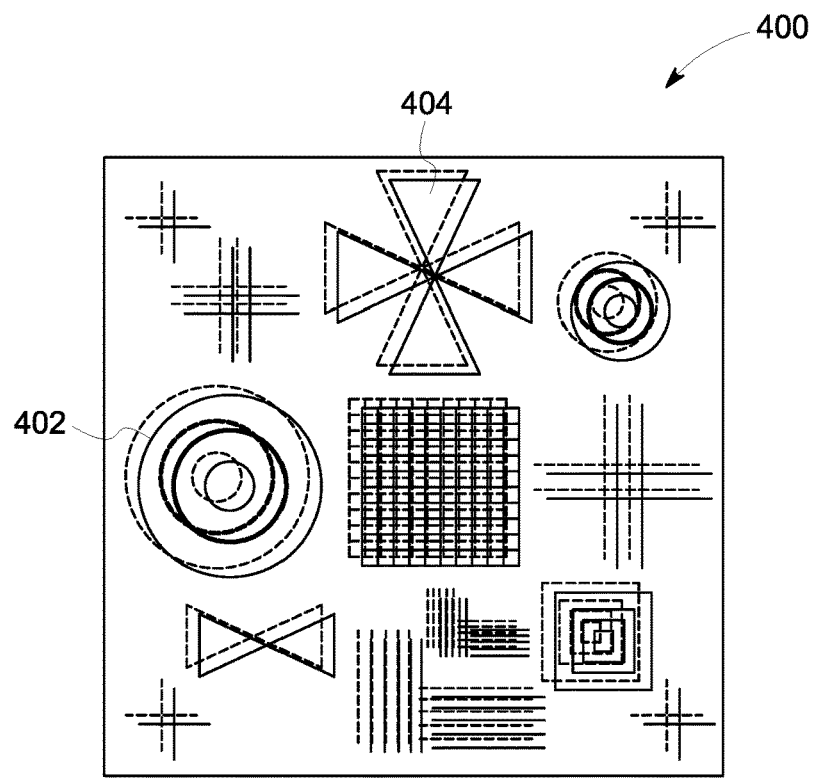
FIG. 4 is a composite image of a standard map and a first intensity map superimposed on each other.

Read-read alignment method 200 further includes generating 218 a first intensity map 404 of first scattering signal 23 using first computing device 24. Read-read alignment method 200 also includes comparing 220 standard map 402 to first intensity map 404 using first computing device 24. FIG. 4 is a composite image 400 of standard map 402 and first intensity map 404 superimposed on each other. Specifically, first computing device 24 compares 220 standard map 402 and first intensity map 404 by superimposing first intensity map 404 on standard map 402 as shown in FIG. 4.

Read-read alignment method 200 also includes determining 222 whether first intensity map 404 is aligned with standard map 402 using first computing device 24. If first intensity map 404 is not aligned with standard map 402, first computing device 24 sends 224 alignment and/or calibration data, such as correction factors, to controller 26. Read-read alignment method 200 further includes aligning 226 first laser beam 16 and/or first laser head 2 such that first intensity map 404 aligns with standard map 402. Specifically, controller 26 manipulates first laser head 2 and/or first optical elements 30, 31, and 32 such that first intensity map 404 aligns with standard map 402.

Read-read alignment method 200 further includes directing 228 second laser beam 17 toward build platform 12 such that second laser beam 17 is scattered by build platform 12 and calibration pattern 50. In the exemplary embodiment, second laser beam 17 has a relatively low laser power, for example about 50 Watts, to avoid damaging build platform 12 and calibration pattern 50. Second laser beam 17 is scattered by build platform 12 and calibration pattern 50 to produce a second scattering signal 29 which is reflected back to mirror 34 and second optical sensor 20.

Read-read alignment method 200 also includes detecting 230 second scattering signal 29 using second optical sensor 20, and simultaneously detecting 232 a location of second laser beam 17. If second laser beam 17 is not incident on calibration marks 52, second scattering signal 29 will have a third reflectance, and if second laser beam 17 is incident on calibration marks 52, second scattering signal 29 will have a fourth reflectance different than the third reflectance. Specifically, second optical sensor 20 detects the intensity of second scattering signal 29, and second computing device 25 receives the coordinates of second laser beam 17 on build platform 12 by receiving positional data from second scanning device 13.

Read-read alignment method 200 also includes transmitting 234 the intensity of second scattering signal 29 along with the coordinates of second laser beam 17 on build platform 12 from second optical sensor 20 to second computing device 25. Specifically, second optical sensor 20 generates an electrical signal that is electronically transmitted to second computing device 25. The electrical signal includes the intensity of second scattering signal 29 along with the coordinates of second laser beam 17 on build platform 12.

Figure 5:
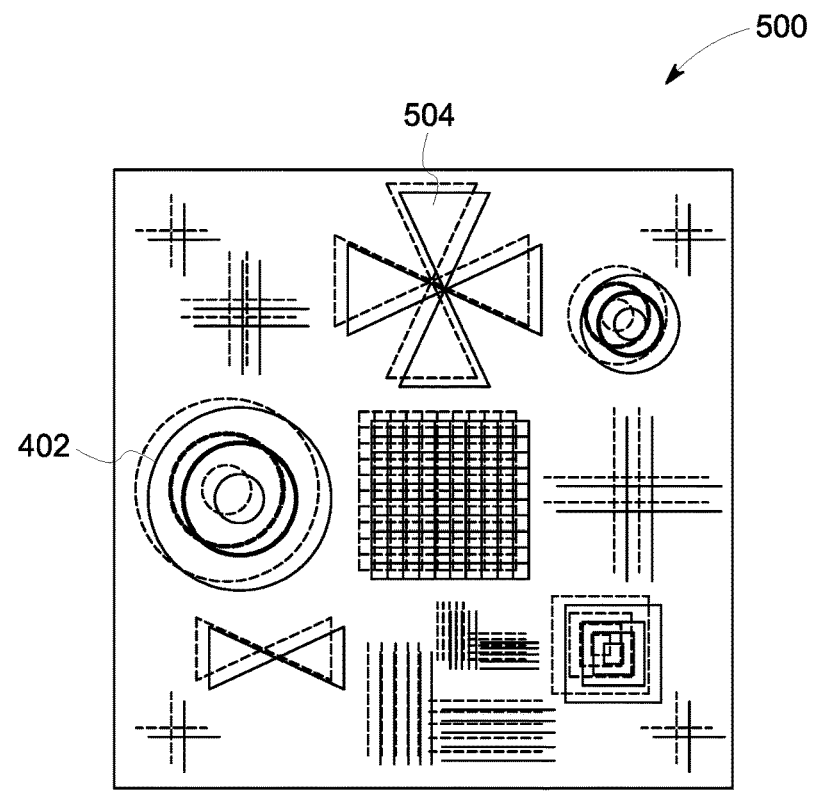
FIG. 5 is a composite image of a standard map and a second intensity map superimposed on each other.

Read-read alignment method 200 further includes generating 236 a second intensity map 504 of second scattering signal 29 using second computing device 25. Read-read alignment method 200 also includes comparing 238 standard map 402 to second intensity map 504 using second computing device 25. FIG. 5 is a composite image 500 of standard map 402 and second intensity map 504 superimposed on each other. Specifically, second computing device 25 compares 238 standard map 402 and second intensity map 504 by superimposing second intensity map 504 on standard map 402 as shown in FIG. 5.

Read-read alignment method 200 also includes determining 240 whether second intensity map 504 is aligned with standard map 402 using second computing device 25. If second intensity map 504 is not aligned with standard map 402, second computing device 25 sends 242 alignment and/or calibration data, such as correction factors, to second controller 27. Read-read alignment method 200 further includes aligning 244 second laser head 4 and/or second laser beam 17 such that second intensity map 504 aligns with standard map 402. Specifically, second controller 27 manipulates second laser head 4 and/or second optical elements 40, 41, and 42 such that second intensity map 504 aligns with standard map 402. Once first laser head 2 (and/or first laser beam 16) and second laser head 4 (and/or second laser beam 17) are aligned with standard map 402, first laser head 2 (and/or first laser beam 16) and second laser head 4 (and/or second laser beam 17) are also aligned with each other and DMLM system 10 may begin manufacturing component 28.

Additionally, calibration marks 52 may be positioned on top side 54 of build platform 12 such that component 28 leaves exposed calibration marks 52 during the manufacturing process. If laser heads 2 and 4 and/or laser beams 16 and 17 become misaligned during the manufacturing process, read-read alignment method 200 may align laser heads 2 and 4 and/or laser beams 16 and 17 using only exposed calibration marks 52. As such, read-read alignment method 200 may align laser beams 16 and 17 during the manufacturing process.

Read-read alignment method 200 aligns laser heads 2 and 4 and/or laser beams 16 and 17 using existing DMLM system 10 hardware. As such, no additional hardware is required to align laser heads 2 and 4 and/or laser beams 16 and 17. Additionally, laser heads 2 and 4 and/or laser beams 16 and 17 can simultaneously scan build platform 12 for quick alignment. Furthermore, build platform 12 may be reused for the manufacture of multiple components 28. Moreover, laser heads 2 and 4 and/or laser beams 16 and 17 can be aligned throughout the manufacturing process. Accordingly, read-read alignment method 200 is a fast, cost effective method of aligning laser heads 2 and 4 and/or laser beams 16 and 17.

FIG. 6 is a flow diagram of a write-read-read alignment method 600. Write-read-read alignment method 600 is similar to read-read alignment method 200 except calibration marks 52 are not pre-existing on build platform 12. Rather, first laser beam 16 writes on top side 54 of build platform 12, or melts and consolidates a portion of build platform 12, to create calibration pattern 50. Laser heads 2 and 4 and/or laser beams 16 and 17 then each read calibration pattern 50 as described in read-read alignment method 200. As such, write-read-read alignment method 600 includes all of the steps of read-read alignment method 200 except forming 204 and scanning 206. Instead write-read-read alignment method 600 includes melting and consolidating 602 calibration marks 52 on top side 54 of build platform 12 using first laser beam 16. In the exemplary embodiment, first laser beam 16 has a relatively high laser power, for example about 150 Watts to about 400 Watts, to ensure that calibration pattern 50 is written into build platform 12. Additionally, first intensity map 404 and second intensity map 504 are not compared to standard map 402. Rather, first intensity map 404 and second intensity map 504 are compared to the build file used to write the calibration pattern 50.

FIG. 7 is a flow diagram of a write-read alignment method 700. Write-read alignment method 700 is similar to write-read-read alignment method 600 except first laser beam 16 does not scan calibration pattern 50 that it wrote on build platform 12. Rather, first laser beam 16 writes on top side 54 of build platform 12, or melts and consolidates a portion of build platform 12, to create calibration pattern 50, and second laser beam 17 then scans calibration pattern 50 as described in read-read alignment method 200 and write-read-read alignment method 600. As such, write-read alignment method 700 includes all of the steps of write-read-read alignment method 600 except directing 210, detecting 212, detecting 214, transmitting 216, generating 218, comparing 220, determining 222, sending 224, and aligning 226. Write-read alignment method 700 does not include any additional steps.

FIG. 8 is a flow diagram of a build-read alignment method 800. Build-read alignment method 800 is similar to write-read alignment method 700 except first laser beam 16 does not write calibration pattern 50 on build platform 12. Rather, first laser beam 16 writes on a portion of component 28 on build platform 12, and second laser beam 17 then scans the recently built portion of component 28 as described in read-read alignment method 200, write-read-read alignment method 600, and write-read alignment method 700. As such, build-read alignment method 800 includes all of the steps of write-read alignment method 700 except melting and consolidating 602. Instead build-read alignment method 800 includes melting and consolidating 802 component 28 on top side 54 of build platform 12 using first laser beam 16. Additionally, second intensity map 504 is not compared to standard map 402. Rather, second intensity map 504 is compared to the build file used to manufacture component 28.

Embodiments of additive manufacturing systems described herein align at least two laser heads in the additive manufacturing system. The additive manufacturing system includes at least two laser beams generated by at least two laser heads, a build platform, and at least two optical sensors. Having more than one laser beam allows the additive manufacturing system to manufacture a component faster than if the additive manufacturing system has only one laser beam. However, the component may not be properly manufactured according to a build file if the laser beams and/or the laser heads are not aligned. The additive manufacturing system described herein is capable of aligning the laser beams and/or the laser heads using four alignment methods: (1) a read-read alignment method; (2) a write-read-read alignment method; (3) a write-read alignment method; and (4) a build-read alignment method. In the read-read alignment method, a build platform with a plurality of pre-existing calibration marks arranged in a calibration pattern is placed in the DMLM system. The laser beams are directed to the build platform by the laser heads, and the optical sensors detect a scattering signal reflected off of the build platform and the calibration pattern. An intensity map is generated based on the detected scattering signal and positional data of the laser beams on the build platform, and compared to a standard map of the calibration pattern. An alignment of each laser beam and/or laser head is determined based on the comparison of the intensity map to the standard map. The laser heads are then aligned such that the intensity map aligns with the standard map, and, as such, the laser beams are aligned with each other.

The write-read-read alignment method is similar to the read-read alignment method, except the calibration marks are not pre-existing on the build platform. Rather, a first laser beam writes the calibration pattern on the build platform, and the laser beams each scan the calibration pattern. The write-read alignment method is similar to the write-read-read alignment method except the first laser beam does not scan the calibration pattern. The build-read alignment method is similar to the write-read alignment method except the first laser beam does not write the calibration pattern on the build platform. Rather, the first laser beam writes on a portion of the component on the build platform, and the second laser beam then scans the recently built portion of the component.

The methods described herein align at least two laser heads and at least two laser beams using existing additive manufacturing hardware. As such, no additional hardware is required to align the laser heads and the laser beams. Additionally, the laser beams can simultaneously scan the build platform for quick alignment. Furthermore, the build platform may be reused for the manufacture of multiple components. Accordingly, the methods described herein provide a fast, cost effective method of aligning at least two laser heads and at least two laser beams. An exemplary technical effect of the methods and systems described herein includes: (a) directing at least one laser toward a calibration pattern on a build platform; (b) detecting a scattering signal reflected off of the build platform and the calibration pattern; (c) determining if at least two lasers are aligned based on the detected scattering signal; and (d) aligning the at least two lasers.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system configured to manufacture a component, said additive manufacturing system comprising:
    a build platform comprising a plurality of calibration marks arranged in a calibration pattern formed on a top side of the build platform;
    at least two laser heads, each laser head comprising:
        at least one laser device configured to generate a laser beam, wherein the laser beam is directed toward said plurality of calibration marks and said build platform, the plurality of calibration marks and the build platform each being configured to scatter the laser beam together to produce a scattering signal;
        a scanning device configured to direct the laser beam toward said plurality of calibration marks and said build platform;
        an optical sensor configured to detect the scattering signal of the laser beam generated by reflecting off of said plurality of calibration marks and said build platform; and
    a computing device configured to:
        receive the scattering signal from said optical sensor;
        generate an intensity map based on the scattering signal; and
        compare the intensity map based on the scattering signal to a standard map of the calibration pattern by superimposing the intensity map on the standard map; and
        wherein said computing device is configured to, based on the comparison of the intensity map to the standard map, align at least one of the laser heads.

2. The additive manufacturing system in accordance with claim 1, wherein a portion of said build platform free of said plurality of calibration marks has a first reflectance and wherein said plurality of calibration marks have a second reflectance different than the first reflectance.

3. The additive manufacturing system in accordance with claim 1, wherein said plurality of calibration marks each have at least one of a cross shape, a circle shape, a triangle shape, a grid pattern, a pattern of dots, and a checkerboard pattern.

4. The additive manufacturing system in accordance with claim 1, wherein the component is positioned on said build platform such that the component leaves exposed at least one calibration mark of said plurality of calibration marks, and wherein the laser beam is directed toward said at least one calibration mark.

5. The additive manufacturing system in accordance with claim 1, wherein said plurality of calibration marks are formed by etching.

6. The additive manufacturing system in accordance with claim 1, wherein said optical sensor is a photo-diode sensor having a sampling rate of about 10 kHz to 1 MHz.

7. The additive manufacturing system in accordance with claim 6, wherein said photo-diode sensor comprises an avalanche photo-diode sensor.

8. The additive manufacturing system in accordance with claim 1, further comprising at least one filter configured to remove stray optical signals from the at least one scattering signal.

9. The additive manufacturing system in accordance with claim 1, wherein said computing device is configured to receive positional data from said scanning device.

10. The additive manufacturing system in accordance with claim 1, wherein said optical sensor is positioned in an on-axis configuration such that said optical sensor is conjugate with a focus of the laser beam.

11. The additive manufacturing system in accordance with claim 1, wherein the intensity map is created based on an intensity of the scattering signal and positional data of the laser beam on the build platform.

12. The additive manufacturing system in accordance with claim 11, wherein the computing device is configured to correlate the intensity and the positional data to generate an intensity map for each of the at least two laser heads.

13. The additive manufacturing system in accordance with claim 12, wherein the computing device is configured to compare the intensity map generated for each of the at least two laser heads to each other to determine if the at least two laser heads are aligned.

14. The additive manufacturing system in accordance with claim 12, wherein the computing device is configured to compare the intensity maps generated for each of the at least two laser heads to the standard map to determine if the at least two laser heads are aligned.

15. The additive manufacturing system in accordance with claim 1, wherein aligning includes aligning the at least one of the laser heads such that intensity map aligns with the standard map.

16. An additive manufacturing system configured to manufacture a component, the additive manufacturing system comprising:
    a build platform comprising a plurality of calibration marks arranged in a calibration pattern;
    a first laser head comprising:
        a first laser device configured to generate a first laser beam, wherein the first laser beam is directed toward the plurality of calibration marks and the build platform;
        a first scanning device configured to direct the first laser beam toward the plurality of calibration marks and the build platform;
        a first optical sensor configured to detect a scattering signal of the first laser beam generated by reflecting off of the plurality of calibration marks and the build platform; and
        a first computing device configured to receive the scattering signal of the first laser beam,
    a second laser head comprising:
        a second laser device configured to generate a second laser beam, wherein the second laser beam is directed toward the plurality of calibration marks and the build platform;
        a second scanning device configured to direct the second laser beam toward the plurality of calibration marks and the build platform;
        a second optical sensor configured to detect a scattering signal of the second laser beam generated by reflecting off of the plurality of calibration marks and the build platform; and a second computing device configured to receive the scattering signal of the second laser beam, wherein the second computing device receives the scattering signal of the second laser beam in synchronization with the first computing device receiving the scattering signal of the first laser beam, and wherein the first computing device is configured to generate a first intensity map corresponding to the scattering signal of the first laser beam and the position of the first laser beam, wherein the second computing device is configured to generate a second intensity map corresponding to the scattering signal of the second laser beam and the position of the second laser beam, and wherein the system is configured to compare the first intensity map and the second intensity map to a standard map by superimposing the first and second intensity maps on the standard map and, based on the comparisons, align the first and second laser heads.

* * * * *